United States Patent
Ogawa

(10) Patent No.: US 11,091,666 B2
(45) Date of Patent: Aug. 17, 2021

(54) EASY PEEL COATING COMPOSITION

(71) Applicant: MITSUBISHI GAS CHEMICAL COMPANY, INC., Tokyo (JP)

(72) Inventor: Noriyoshi Ogawa, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 153 days.

(21) Appl. No.: 16/472,628

(22) PCT Filed: Nov. 8, 2017

(86) PCT No.: PCT/JP2017/040261
§ 371 (c)(1),
(2) Date: Jun. 21, 2019

(87) PCT Pub. No.: WO2018/123282
PCT Pub. Date: Jul. 5, 2018

(65) Prior Publication Data
US 2019/0359847 A1    Nov. 28, 2019

(30) Foreign Application Priority Data

Dec. 26, 2016 (JP) .............................. JP2016-251414

(51) Int. Cl.
| C09D 169/00 | (2006.01) |
| C09D 7/20 | (2018.01) |
| C08G 64/06 | (2006.01) |
| C08G 64/24 | (2006.01) |
| C09D 5/20 | (2006.01) |

(52) U.S. Cl.
CPC ............ *C09D 169/00* (2013.01); *C08G 64/06* (2013.01); *C08G 64/24* (2013.01); *C09D 5/20* (2013.01); *C09D 7/20* (2018.01)

(58) Field of Classification Search
None
See application file for complete search history.

(56) References Cited

U.S. PATENT DOCUMENTS

| 6,174,966 B1 | 1/2001 | Kobayashi |
| 6,541,109 B1 | 4/2003 | Kumar et al. |
| 2010/0183901 A1 | 7/2010 | Van Ginneken et al. |
| 2013/0032281 A1 | 2/2013 | Van Den Berg et al. |
| 2014/0087156 A1 | 3/2014 | Sarkis |

FOREIGN PATENT DOCUMENTS

| CN | 102883823 A | 1/2013 |
| JP | 37-15019 | 9/1962 |
| JP | 5-59310 | 3/1993 |
| JP | 2000-129171 | 5/2000 |
| JP | 2003-511540 | 3/2003 |
| JP | 2010-100713 | 5/2010 |
| JP | 2010-529246 | 8/2010 |
| JP | 2014-522301 | 9/2014 |
| JP | 2016-56224 | 4/2016 |
| JP | 2016-160291 | 9/2016 |

OTHER PUBLICATIONS

Extended European Search Report dated Oct. 19, 2019 in EP application 17885681.1.
Official Communication issued in International Bureau of WIPO Patent Application No. PCT/JP2017/040261, dated Dec. 12, 2017.

*Primary Examiner* — Robert T Butcher
(74) *Attorney, Agent, or Firm* — Greenblum & Bernstein, P.L.C.

(57) ABSTRACT

The present invention addresses the problem of providing: a peelable coating composition for which peeling due to light impact or scratch after drying is effectively prevented while peeling easily in operations in which peeling is intended; and a coating film obtained by drying said composition. The problem is solved by an easy peel coating composition comprising a polycarbonate resin with structural units represented by general formula (1): (1) and a non-halogen-based organic solvent, wherein the content of the polycarbonate resin in the composition is 0.1-50 mass % and the proportion of structural units represented by general formula (2): (2) in the structural units represented by general formula (1) is 0-80% as a mole ratio.

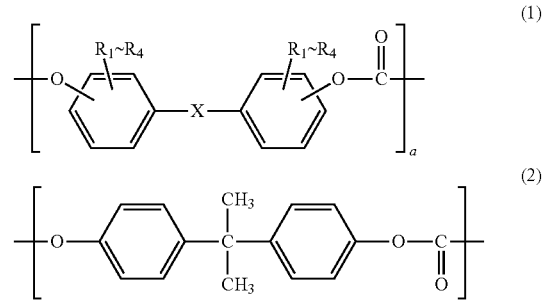

6 Claims, No Drawings

EASY PEEL COATING COMPOSITION

TECHNICAL FIELD

The present invention relates to an easy peel coating composition which is strong against scratching and impact after application, and which can easily be peeled off when necessary, and to a coating film obtained by drying said composition.

BACKGROUND ART

While there are various methods for protecting a surface of an article, methods that use an easy peel coating called removable coating and stoppable coating which can temporarily form a surface coat (coating film) that can be peeled off as needed. The role of such an easy peel coatings is partially to prevent a scratch and corrosion (rust) of a metal product during transport/storage. Although aqueous coatings are becoming the mainstream of easy peel coatings due to environmental concern, there still exists a great demand for organic solvent-based easy peel coatings since use of an aqueous coating induces rusting of a surface of an iron-based metal product.

PRIOR ART DOCUMENTS

Patent Documents

Patent document 1: Japanese Unexamined Patent Application Publication No. H05-059310
Patent document 2: Japanese Unexamined Patent Application Publication No. 2010-100713

SUMMARY OF INVENTION

Problem to be Solved by the Invention

Since a vinyl acetate-based resin, a polybutyral-based resin, a silicone-based resin or the like is primarily used in an organic solvent-based easy peel coating, a coating film resulting from such a resin is soft and rubbery (Patent documents 1 and 2). Therefore, they are poor in surface protection since they can easily be peeled off by being scratched or upon receiving impact, which leaves much room for improvement.

The problem of the present invention is to provide a peelable coating composition with which peeling caused by light impact or scratching after drying can effectively be prevented and which can easily be peeled off by an operation intended for peeling, and a coating film obtained by drying said composition.

Means for Solving the Problem

The present inventors have gone through extensive investigation to solve the above-described problem, and as a result of which found that a polycarbonate resin having a specific structural unit has good solubility in an organic solvent, has excellent transparency, has moderate hardness and adhesion to metal after drying, and capable of forming a coating film which can serve as a strong protective film that can also easily be peeled off, thereby accomplishing the present invention.

Thus, the present invention is characterized as follows.
[1] An easy peel coating composition comprising:
a polycarbonate resin having a structural unit represented by General formula (1):

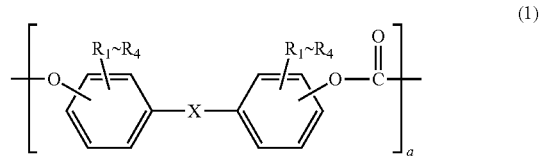

wherein, $R_1$-$R_4$ each independently represent hydrogen, fluorine, chlorine, bromine, iodine, or an optionally substituted C1-C20 alkyl group, C6-C12 aryl group, C2-C12 alkenyl group, C1-C5 alkoxy group or C7-C17 aralkyl group;
a represents an integer of 1-1,000; and
X represents

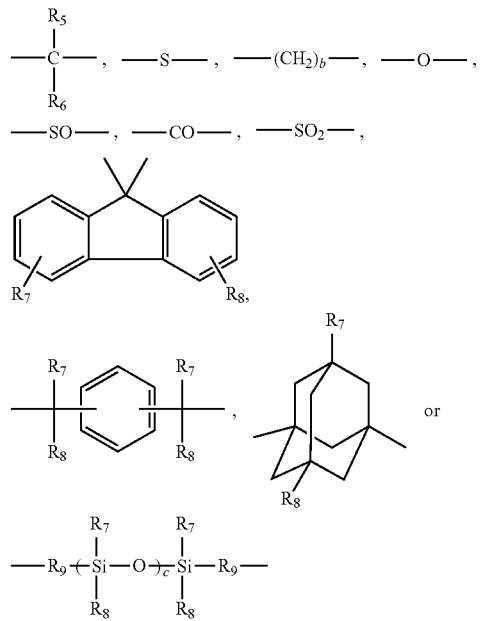

(wherein $R_5$ and $R_6$ each independently represent hydrogen, fluorine, chlorine, bromine, iodine, or an optionally substituted C1-C20 alkyl group, C1-C5 alkoxy group or C6-C12 aryl group, or $R_5$ and $R_6$ bind to each other to represent a group that forms a C5-C20 carbocyclic ring or a heterocyclic ring with an element number of 5-12;
$R_7$ and $R_8$ each independently represent hydrogen, fluorine, chlorine, bromine, iodine, or an optionally substituted C1-C9 alkyl group, C1-05 alkoxy group, C2-C12 alkenyl group or C6-C12 aryl group;
$R_9$ represents an optionally substituted C1-C9 alkylene group;
b represents an integer of 0-20; and
c represents an integer of 1-500); and
a non-halogen-based organic solvent,
wherein the content of the polycarbonate resin in the composition is 0.1-50 mass %, and the proportion of the structural unit represented by General formula (2) below:

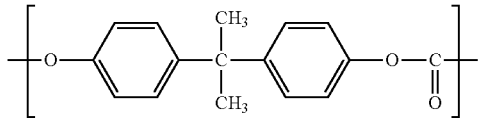
(2)

in the structural unit represented by General formula (1) is 0-80% in a molar ratio.

[2] The composition according to [1], wherein a peel hardness of the dried coating film is 4H or harder.

[3] The composition according to either one of [1] and [2], wherein the main component of the non-halogen-based organic solvent is a solvent comprising at least one selected from the group consisting of an aromatic hydrocarbon-based solvent, an ester-based solvent, a ketone-based solvent and an ether-based solvent.

[4] The composition according to any one of [1]-[3], wherein the structural unit represented by General formula (1) is any one or more selected from the group consisting of the structural units represented by General formulae (3)-(10):

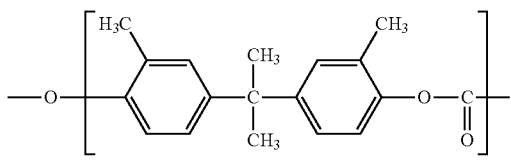
(3)

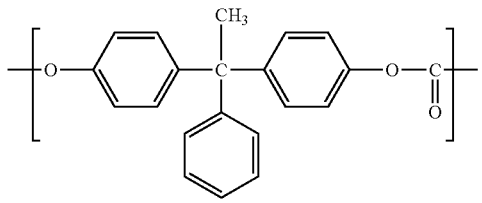
(4)

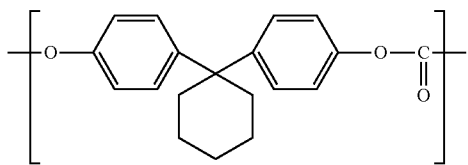
(5)

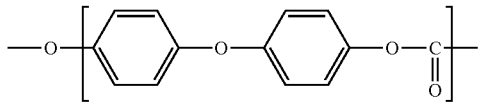
(6)

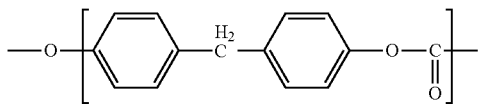
(7)

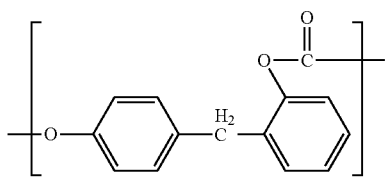
(8)

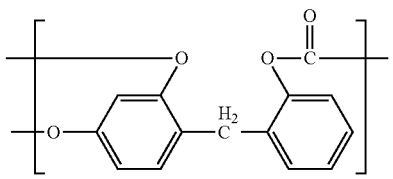
(9)

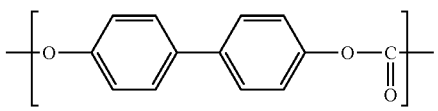
(10)

[5] The composition according to any one of [1]-[4], which is used for protecting a surface of a metallic instrument or part.

[6] The composition according to any one of [1]-[5], wherein the polycarbonate resin has an intrinsic viscosity of 0.3-2.0 dl/g.

[7] A coating film obtained by drying the composition according to any one of [1]-[6].

Effect of the Invention

In comparison to a coating film obtained with a conventional easy peel coating, the present invention can provide an easy peel coating composition, which can effectively prevent peeling caused by light impact or scratching after drying and which can easily be peeled off by an operation intended for peeling. The easy peel coating composition of the present invention is an organic solvent-based coating, which is advantageous in preventing rusting by coating it on a surface of a metal product, particularly an iron-based metal product.

MODES FOR CARRYING OUT THE INVENTION

[Easy Peel Coating Composition]

The easy peel coating composition of the present invention is a composition comprising a polycarbonate resin having a structural unit represented by General formula (1):

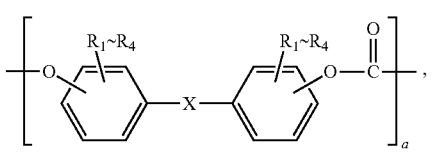
(1)

and a non-halogen-based organic solvent.

In General formula (1) above, $R_1$-$R_4$ each independently represent hydrogen, fluorine, chlorine, bromine, iodine, or an optionally substituted C1-C20 alkyl group, C6-C12 aryl group, C2-C12 alkenyl group, C1-C5 alkoxy group or C7-C17 aralkyl group;

a represents an integer of 1-1,000, preferably 10-900 and more preferably 30-600;

and

X represents

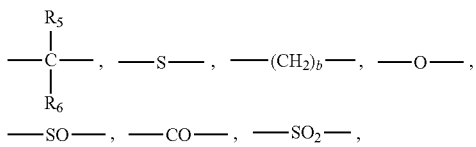

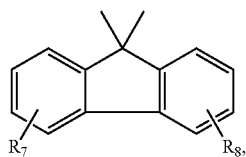 or 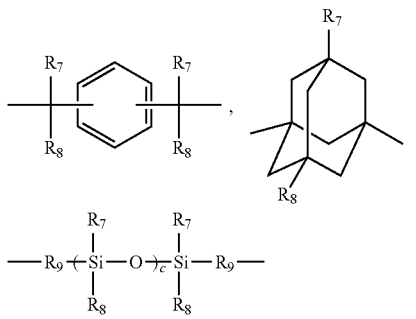

(wherein $R_5$ and $R_6$ each independently represent hydrogen, fluorine, chlorine, bromine, iodine, or an optionally substituted C1-C20 alkyl group, C1-C5 alkoxy group or C6-C12 aryl group, or $R_5$ and $R_6$ bind to each other to represent a group that forms a C5-C20 carbocyclic ring or a heterocyclic ring with an element number of 5-12;

$R_7$ and $R_8$ each independently represent hydrogen, fluorine, chlorine, bromine, iodine, or an optionally substituted C1-C9 alkyl group, C1-C5 alkoxy group, C2-C12 alkenyl group or C6-C12 aryl group;

$R_9$ represents an optionally substituted C1-C9 alkylene group;

b represents an integer of 0-20, preferably 1-15 and more preferably 1-10; and c represents an integer of 1-500, preferably 1-300 and more preferably 1-200).

The proportion of the structural unit represented by General formula (2) below:

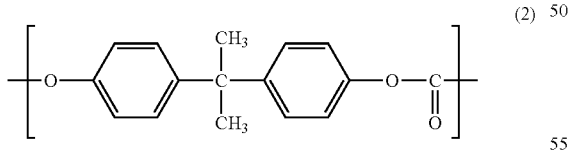 (2)

in the structural unit represented by General formula (1) is 0-80%, preferably 0-70% and more preferably 0-60% in a molar ratio. Since the minimum proportion of the structural unit is 0%, the structural unit represented by General formula (2) is an optional structural unit which may or may not be contained in the structural unit represented by General formula (1). Furthermore, as will be described later, the structural unit represented by General formula (2) is a structural unit derived from 2,2-bis(4-hydroxyphenyl)propane. If the structural unit represented by General formula (1) consists only of the structural unit derived from 2,2-bis(4-hydroxyphenyl)propane (i.e., 100%), its solubility in toluene, xylene, methyl ethyl ketone, ethyl acetate and the like which are generally used organic solvents would be poor, and thus its maximum content is set to 80%. The molar ratio of each structural unit may be determined based on the molar ratio of the monomer used for synthesizing the polycarbonate resin. Alternatively, the molar ratio may be calculated through an analysis such as nuclear magnetic resonance spectroscopy.

The structural unit represented by General formula (1) above is preferably any one or more selected from the group consisting of the structural units represented by General formulae (3)-(10) below:

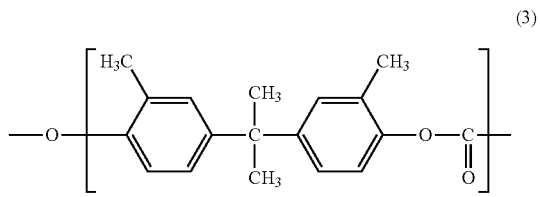 (3)

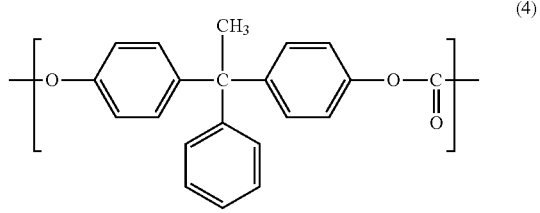 (4)

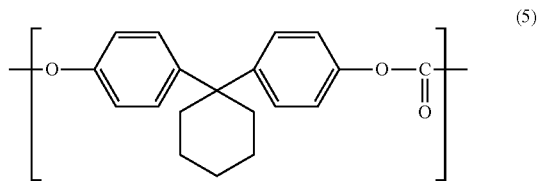 (5)

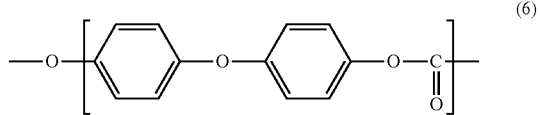 (6)

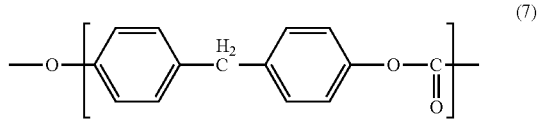 (7)

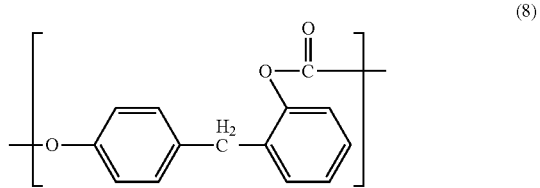 (8)

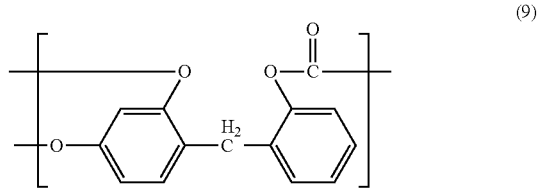 (9)

-continued

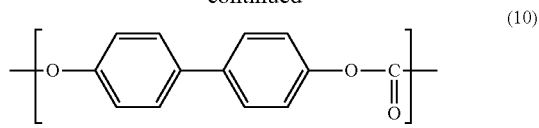

(10)

While the viscosity of the easy peel coating composition of the present invention may suitably be determined according to an intended application method, it is preferably in a range of 1-20,000 mPa·s. The viscosity is more preferably in a range of 400-20,000 mPa·s in a case of airless spray, brush application or roller application, more preferably in a range of 100-6,000 mPa·s in a case of air spray, and more preferably in a range of 1-500 mPa·s in a case of a spray can.

As compared to a coating film of a conventional easy peel coating composition, the hardness of a coating film obtained by applying and drying the easy peel coating composition of the present invention should be moderate such that it is unlikely to result a scratch and peeling by scratching, impact or the like during transport or storage and that allows easy peeling. Preferably, it has a pencil hardness of at least HB or harder. Provided that a peel hardness of a coating film refers to a pencil hardness that causes peeling of the coating film, the peel hardness of the easy peel coating composition of the present invention is preferably 4H or harder. Preferably, the pencil hardness is F or harder while the peel hardness of the coating film is 5H or harder. At the same time, the pencil hardness is preferably 4H or softer while the peel hardness of the coating film is preferably 7H or softer. A specific method for measuring a peel hardness of a coating film will be described in Examples.

A thickness of a coating film obtained after applying and drying an easy peel coating composition of the present invention is preferably in a range of 1-200 μm, particularly 5-120 μm, and more preferably in a range of 10-60 μm. By making the thickness of the coating film to be 1 μm or more, the surface protection strength can be ensured, while a thickness of 200 μm or less will suppress peeling caused by shrinking of the coating film, which is economical and thus favorable considering application of the coating film that would eventually be peeled off and discarded.

As described above, as compared to a conventional coating film, the coating film obtained by drying the easy peel coating composition of the present invention has a moderate hardness that is unlikely to cause a scratch or peeling due to scratching, impact or the like during transport or storage and that allows easy peeling by an operation intended for peeling. Herein, an "operation intended for peeling" refers to an operation that is performed when peeling is required, which may be, for example, peeling by inserting a wedge-shaped tool between the bottommost part of the coating film and the surface of the article, or planar peeling using an adhesive tape.

<Polycarbonate Resin>

A polycarbonate resin used for an easy peel coating composition of the present invention can be produced by allowing reaction between a bisphenol that can induce the structural unit (1) and a carbonate-ester-forming compound. Specifically, a known method employed for producing a polycarbonate derived from bisphenol A, for example, a method that employs direct reaction between a bisphenol and phosgene (phosgenation) or that employs transesterification reaction between a bisphenol and a bis-aryl carbonate (transesterification) may be employed for production.

A bisphenol that induces the structural unit (1), i.e., a starting monomer of a polycarbonate resin used for the easy peel a coating film composition of the present invention, is represented by Structural formula (11) below

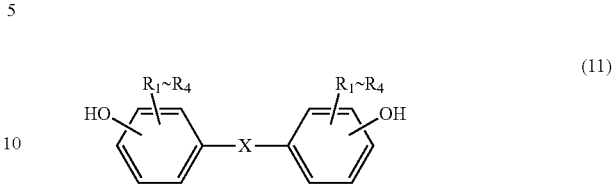

(11)

(wherein, $R_1$-$R_4$ and X are each identical to those in General formula (1))

Specifically, examples of the monomer represented by Structural formula (11) above include 4,4'-biphenyldiol, bis(4-hydroxyphenyl)methane, bis(2-hydroxyphenyl)methane, 2,4'-dihydroxy diphenylmethane, bis(4-hydroxyphenyl) ether, bis(4-hydroxyphenyl)sulfone, 2,4'-dihydroxy diphenylsulfone, bis(2-hydroxyphenyl)sulfone, bis(4-hydroxy-3-methylphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 1,1-bis(4-hydroxyphenyl)-1-phenylethane, bis(4-hydroxyphenyl)diphenylmethane, 2,2-bis(4-hydroxyphenyl)propane, 2,2-bis(4-hydroxy-3-methylphenyl)propane, 1,1-bis(4-hydroxy-3-methylphenyl)ethane, bis(4-hydroxy-3-methylphenyl)methane, 2,2-bis(4-hydroxy-3-t-butylphenyl)propane, 2,2-bis(4-hydroxyphenyl)butane, 1,1-bis(4-hydroxyphenyl)cyclohexane, 1,1-bis(4-hydroxy-3-methylphenyl)cyclohexane, 1,1-bis(4-hydroxyphenyl)cycloundecane, 1,1-bis(4-hydroxyphenyl)cyclododecane, 2,2-bis(4-hydroxy-3-allyl phenyl)propane, 3,3,5-trimethyl-1,1-bis(4-hydroxyphenyl)cyclohexane, 9,9-bis(4-hydroxy-3-ethylphenyl)fluorene, 9,9-bis(4-hydroxy-3-methylphenyl)fluorene, 9,9-bis(4-hydroxyphenyl)fluorene, α,ω-bis[3-(o-hydroxyphenyl)propyl]polydimethyl diphenyl random copolymerization siloxane, α,ω-bis[3-(o-hydroxyphenyl)propyl]polydimethyl siloxane, 4,4'-[1,4-phenylene bis(1-methylethylidene)]bisphenol, 4,4'-[1,3-phenylene bis(1-methylethylidene)]bisphenol, adamantane, 2,2-bis(4-hydroxyphenyl)butane, 1,1-bis(4-hydroxyphenyl)-2-ethylhexane, 1,1-bis(4-hydroxyphenyl)-2-methylpropane, 2,2-bis(4-hydroxyphenyl)-4-methylpentane, 1,1-bis(4-hydroxyphenyl)decane and 1,3-bis(4-hydroxyphenyl)-5,7-dimethyladamantane. Two or more of them may be used in combination. Moreover, among them, 4,4'-biphenyldiol, bis(4-hydroxyphenyl)methane, bis(2-hydroxyphenyl)methane, 2,4'-dihydroxy diphenylmethane, bis(4-hydroxyphenyl) ether, 2,2-bis(4-hydroxyphenyl)propane, 2,2-bis(4-hydroxy-3-methylphenyl)propane and 1,1-bis(4-hydroxyphenyl)cyclohexane are particularly favorable. Use of 2,2-bis(4-hydroxyphenyl)propane alone is not favorable since its solubility in toluene, xylene, methyl ethyl ketone and ethyl acetate which are generally used organic solvents would be poor. Therefore, if 2,2-bis(4-hydroxyphenyl)propane is to be used as a monomer represented by Structural formula (11) above, the amount of 2,2-bis(4-hydroxyphenyl)propane in the monomer represented by Structural formula (11) is 0-80%, preferably 0-70% and more preferably 0-60% in a molar ratio.

For phosgenation, a monomer represented by General formula (11) above and phosgene are allowed to react usually in the presence of an acid binder and a solvent. Examples of the acid binder include pyridine and hydroxides of alkali metals such as sodium hydroxide and potassium hydroxide while examples of the solvent include methylene chloride and chloroform. Furthermore, a catalyst, for example, a tertiary amine such as triethylamine or a quaternary ammonium salt such as benzyltriethyl ammonium chloride is preferably added in order to promote the polycondensation reaction, while a monofunctional compound such as phenol, p-t-butylphenol, p-cumylphenol or long-chain alkyl-substituted phenol is preferably added as a molecular weight modifier in order to adjust the polymerization degree. If desired, a small amount of an antioxidant such as sodium sulfite or hydrosulphite, and a branching agent such as phloroglucin or isatin bisphenol may also be added. The reaction can suitably be carried out usually at 0-150° C. and preferably at 5-40° C. Although the reaction time may vary according to the reaction temperature, it is usually 0.5 minutes-10 hours, and preferably 1 minute-2 hours. Moreover, the pH of the reaction system during the reaction is preferably maintained at 10 or higher.

On the other hand, for transesterification, the monomer represented by General formula (11) above is mixed with bis-aryl carbonate to allow reaction under reduced pressure at a high temperature. Examples of bis-aryl carbonate include bis-aryl carbonates such as diphenyl carbonate, di-p-tolyl carbonate, phenyl-p-tolyl carbonate, di-p-chlorophenyl carbonate and dinaphthyl carbonate. Two or more of these compounds may be used in combination. The reaction is usually carried out at 150-350° C. and preferably at 200-300° C., while the degree of pressure reduction is preferably set to 1 mmHg or lower in the end so as to distill the phenol derived from the bis-aryl carbonate generated by transesterification reaction outside the system. Although the reaction time may vary according to the reaction temperature and the degree of pressure reduction, it is usually about 1-24 hours. The reaction is preferably carried out under an inert gas atmosphere such as nitrogen or argon. If desired, a molecular weight modifier, an antioxidant or a branching agent may be added upon carrying out the reaction.

Preferably, the polycarbonate resin used for the easy peel coating composition of the present invention preferably has solvent solubility, application property, peelability, scratch resistance, impact resistance and the like in well balance as required as a coating film-forming resin contained in an easy peel coating. The scratch resistance and the impact resistance strength can be enhanced by making the minimum intrinsic viscosity of the resin to be at a predetermined value or higher, while a decrease in the solvent solubility and an increase in the viscosity of the solution can be suppressed to maintain the application property by making the maximum intrinsic viscosity to be at a predetermined value or lower. The intrinsic viscosity is preferably in a range of 0.3-2.0 dl/g and more preferably in a range of 0.35-1.5 dl/g.

The blending amount of the polycarbonate resin in the easy peel coating composition of the present invention is 0.1-50 mass %. Depending on the intrinsic viscosity and the solvent solubility, the blending amount is preferably 1-30 mass % and more preferably 3-25 mass %. If the blending amount of the polycarbonate resin is within said range, the solvent solubility and the application property will be in a well balance, thereby enhancing workability and appearance.

<Non-Halogen-Based Organic Solvent>

The easy peel coating composition of the present invention is a solution obtained by dissolving the above-described polycarbonate resin in a non-halogen-based organic solvent, which is in a form of a so-called clear color coating. The easy peel coating composition of the present invention may also be a colored coating composition by dissolving or dispersing a dye and/or a pigment desired.

As the solvent of the easy peel coating composition of the present invention, a coating solvent that is generally called a strong solvent or a weak solvent is primarily used. Specific examples include aromatic hydrocarbon-based solvents such as toluene, xylene, ethylbenzene, trimethylbenzene and cumene, ester-based solvents (for example, carboxylic acid ester-based solvents such as methyl acetate, ethyl acetate, butyl acetate, 2-ethoxyethyl acetate, 2-methoxy-1-methylethyl acetate and ethyl lactate, and carbonic acid ester-based solvents such as dimethyl carbonate and ethyl methyl carbonate), ketone-based solvents such as acetone, methyl ethyl ketone, methyl isobutyl ketone, cyclohexanone and isophorone, ether-based solvents such as tetrahydrofuran, 1,4-dioxane, diethyl ether, anisole, dimethoxymethane and ethyl cellosolve, alcohol-based solvents such as ethanol, isopropyl alcohol, isobutanol and normal butanol, aliphatic hydrocarbon-based solvents such as n-hexane, n-heptane, isohexane, cyclohexane, methylcyclohexane and nonane, and mixed solvents for coatings such as mineral spirit, coating thinner and turpentine. These solvents may be used alone or may freely be combined as long as it can dissolve the polycarbonate resin used for the present invention. Among them, the polycarbonate resin is preferably dissolved in an aromatic hydrocarbon such as toluene, xylene, trimethylbenzene or cumene, an ester-based solvent such as methyl acetate, ethyl acetate or butyl acetate, or a ketone-based solvent such as methyl ethyl ketone or cyclohexanone since they are inexpensive and good in workability, where toluene, xylene, methyl ethyl ketone or ethyl acetate is particularly preferable. Since halogen-based organic solvents (for example, organic chlorine-based solvents) have great effects on the health of the operator who is handling and great burden on the environment and their use is strictly regulated, they are rarely used as coating solvents. Accordingly, the solvent used for the peelable coating composition of the present invention does not contain a halogen-based organic solvent.

<Optional Additives>

In order to enhance the color effect, the easy peel coating composition of the present invention may be added with a pigment, a dye, coloring particles or light interference particles. Examples of the pigment or the dye include organic pigments such as azo pigments and phthalocyanine pigments, specifically, for example, Red No. 104, Red No. 106, Red No. 201, Red No. 202, Red No. 204, Red No. 215, Red No. 220, Orange No. 203, Orange No. 204, Blue No. 1, Blue No. 404, Yellow No. 205, Yellow No. 401 and Yellow No. 405. Alternatively, in order to give white color, pearl color, metallic color or glitter, mica titanium, titanium oxide, iron oxide, tin oxide, zirconium oxide, chromium oxide, bismuth oxychloride, silica, chromium, titanium nitride, titanium, magnesium fluoride, gold, silver, nickel or the like may also be used. Light interference particles refer to particles that enhance color effect through light reflection and scattering, and examples thereof include glass beads, tiny shells, mica and the like. According to need, they are preferably added to the coating composition in an amount of 0.0001-10.0 mass %.

Additionally, if necessary, an anti-rust agent, an antioxidant, a dispersant, a UV absorbent, a defoaming agent, a leveling agent or the like may be added.

EXAMPLES

Hereinafter, the content of the present invention will be described in detail by way of examples of the present invention as well as comparative examples, although the present invention should not be limited to these examples.

<Solvent Solubility>

A resin to be used in Examples and Comparative examples was solely added to each solvent at a concentration of 8-25 mass % and then placed in a sealed container. The solution was shaken with a shaker for 24 hours and placed in a 10-mm glass cell. Light transmittance of this glass cell at a wavelength of 700 nm was measured with UV-1800 spectrophotometer from Shimadzu Corporation. Provided that the transmittance of an equivalent glass cell with only the solvent without the resin being dissolved was 100%, the light transmittance of the solution was corrected and regarded as solution transmittance (%). Those that had been confirmed to have no visible solid matter and that had solution transmittance of 95% or higher were determined to be in a dissolved state (="A"). Those that had visible solid matter and that had solution transmittance of less than 95% were determined to be in an insufficiently dissolved state (="C"). Those that were unable to evaluate for the resin alone because a dye or the like was contained therein were determined to be unmeasurable (="-").

<Pencil Hardness>

Pursuant to JIS K5600, pencils were sequentially pressed against a surface of a dried coating film with a thickness of 15-60 μm formed on a steel plate at an angle of 45 degrees and a load of 750 g starting from softer pencil, and the hardness of the hardest pencil that did not give a scratch was recorded as the pencil hardness. The pencil hardness was represented with a scale of 2B, B, HB, F, H, 2H, 3H, 4H, 5H, 6H and 7H ranging from softest to hardest.

<Peel Hardness of Coating Film>

Measurement was carried out in the same manner as the pencil hardness measurement pursuant to JIS K5600. Unlike the pencil hardness test, pencils were pressed against a surface of a dried coating film with a thickness of 15-60 μm formed on a steel plate so as to record, instead of the hardness of the hardest pencil that did not give a scratch, the hardness of the pencil that caused peeling of the coating film as the peel hardness of the coating film.

<Peeling Resistance Upon Impact>

A coating film surface of a metal plate having the coating film was struck with a 2J hammer according to the Izod impact test pursuant to JIS K7110 to visually confirm the presence of peeling of the coating film. Evaluations were made under the following criteria.

A: No peeling
B: No peeling but with presence of crack
C: Peeling

<Peelability>

The edge of a thin steel plate (dimensions: 100×100×0.4 mm, type: SPCC) formed with a coating film with a thickness of 15-60 μm was scratched with a resin-made spatula and the resin-made spatula was inserted between the metal surface and the surface of the coating film making contact therewith to evaluate peelability. Peelability was visually confirmed and the evaluations were made under the following criteria.

A: Coating film was peeled off as a single piece of coating film with a size of 3 cm×3 cm or larger
C: Coating film was peeled off as a piece less than 3 cm×3 cm <Method for Measuring Intrinsic Viscosity>

An intrinsic viscosity [η] deciliter/gram of a polycarbonate resin of the present invention was calculated according to Equation (I) below at Huggins constant of 0.45, by measuring a 0.5 grams/deciliter solution of a polycarbonate resin in methylene chloride with a Ubbelohde capillary viscometer at a temperature of 20° C.

$$\eta = 1.23 \times 10^{-4} \times M_v^{0.83} \tag{I}$$

<Method for Measuring Viscosity of Coating>

The viscosity of the coating was measured at 25° C. using a vibro viscometer (CJV5000) from A&D Company and VT-04 viscometer from Rion Co., Ltd. (used only in Comparative example 5).

Example 1

102.4 g (0.4 mol) of 2,2-bis(4-hydroxy-3-methylphenyl-)propane (hereinafter, simply referred to as "BPC": from Honshu Chemical Industry) and 0.1 g of hydrosulphite were dissolved in 1,100 ml of a 5 w/w % aqueous sodium hydroxide solution.

To this, 500 ml of methylene chloride was added and stirred while adding 0.5 g of benzyltriethyl ammonium chloride (hereinafter, simply referred to as "TEBAC"). Then, 60 g of phosgene was blown into the resultant for 60 minutes while keeping at 15° C.

After phosgene was blown, 1.5 g of p-t-butylphenol (hereinafter, simply referred to as "PTBP": from Dainippon Ink and Chemicals, Incorporated) was added as a molecular weight modifier and vigorously stirred to emulsify the reaction solution. At the end of emulsification, 0.4 ml of triethylamine was added and stirred at 20-25° C. for about an hour to allow polymerization.

Following polymerization, the reaction solution was separated into a water phase and an organic phase. The organic phase was neutralized with phosphoric acid, and washed with water until the conductivity of the former liquid (water phase) became 10 μS/cm or less. The resulting polymer solution was allowed to drop into hot water that was kept at 45° C. to remove the solvent by evaporation, thereby obtaining white powdery precipitate. The obtained precipitate was filtrated and dried at 105° C. for 24 hours to obtain polymer powder.

The intrinsic viscosity of a solution of this polymer in methylene chloride as a solvent, at a concentration of 0.5 g/dl was 0.65 dl/g at 20° C. The resulting polymer was analyzed by infrared absorption spectrum. As a result, absorption by a carbonyl group was observed near 1,770 cm$^{-1}$ while absorption by ether linkage was observed near 1,240 cm$^{-1}$, confirming that it was a polycarbonate resin having carbonate linkage (hereinafter, simply referred to as "PC-1").

10 parts by mass of the resulting PC-1 and 90 parts by mass of toluene were mixed to prepare coating solution A (viscosity: 23 mPa·s). This coating solution was loaded into a spray gun from Ishii Brush Sangyo to spray the coating solution onto the entire surface of one side of a thin steel plate (dimensions: 100×100×0.4 mm, type: SPCC). After air drying for 24 hours, the pencil hardness, the peel hardness and peelability for the thin steel plate were evaluated. The thickness of the film was measured after the peelability test, where the average film thickness was 27 μm. Similarly, coating solution A was also sprayed onto the entire surface of one side of another thin steel plate (dimensions: 100× 20×0.4 mm, type: SPCC) and dried to perform a test for peeling resistance upon impact with an Izod impact tester.

Example 2

Polymerization was conducted in the same manner as Example 1 except that the amount of BPC was changed to 60.4 g, that the amount of PTBP was changed to 1.8 g and that 40.1 g of 2,2-bis(4-hydroxyphenyl)propane (hereinafter, simply referred to as "BPA": from Mitsubishi Chemical) was used, thereby obtaining a polycarbonate resin (intrinsic viscosity: 0.58 dl/g, hereinafter simply referred to as "PC-2"). 10 parts by mass of the resulting PC-2 was mixed with 90 parts by mass of toluene to prepare coating solution B (viscosity: 17 mPa·s), which was subjected to application and evaluation in the same manner as Example 1.

Example 3

Polymerization was conducted in the same manner as Example 1 except that 116 g of 1,1-bis(4-hydroxyphenyl)-1-phenylethane (hereinafter, simply referred to as "BPAP": from Honshu Chemical Industry) was used instead of BPC, that the amount of PTBP was changed to 2.0 g and that TEBAC was not used, thereby obtaining a polycarbonate resin (intrinsic viscosity: 0.43 dl/g, hereinafter simply referred to as "PC-3"). 15 parts by mass of the resulting PC-3 and 85 parts by mass of toluene were mixed to prepare coating solution C (viscosity: 52 mPa·s), which was subjected to application and evaluation in the same manner as Example 1.

Example 4

Polymerization was conducted in the same manner as Example 1 except that 107.2 g of 1,1-bis(4-hydroxyphenyl)cyclohexane (hereinafter, simply referred to as "BPZ": from Honshu Chemical Industry) was used instead of BPC, that the amount of PTBP was changed to 0.6 g and that TEBAC was not used, thereby obtaining a polycarbonate resin (intrinsic viscosity: 0.96 dl/g, hereinafter simply referred to as "PC-4"). 8 parts by mass of the resulting PC-4 was mixed with 92 parts by mass of toluene to prepare coating solution D (viscosity: 101 mPa·s), which was subjected to application and evaluation in the same manner as Example 1.

Example 5

Polymerization was conducted in the same manner as Example 1 except that 36 g of a 18:49:32 mass % mixture of bis(4-hydroxyphenyl)methane, bis(2-hydroxyphenyl)methane and 2,4'-dihydroxy diphenylmethane (hereinafter, simply referred to as "BPF": from GUNEI Chemical Industry) and 51 g of BPA were used instead of BPC, that the amount of PTBP was changed to 1.4 g and that TEBAC was not used, thereby obtaining a polycarbonate resin (intrinsic viscosity: 0.51 dl/g, hereinafter simply referred to as "PC-5"). 12 parts by mass of the resulting PC-5 was mixed with 40 parts by mass of ethyl acetate and 48 parts by mass of methyl ethyl ketone to prepare coating solution E (viscosity: 31 mPa·s), which was subjected to application and evaluation in the same manner as Example 1.

Example 6

Polymerization was conducted in the same manner as Example 1 except that 40.4 g of bis(4-hydroxyphenyl)ether (hereinafter, simply referred to as "DHPE": from Tokyo Chemical Industry) and 53.6 g of BPZ were used instead of BPC, that the amount of PTBP was changed to 1.56 g and that TEBAC was not used, thereby obtaining a polycarbonate resin (intrinsic viscosity: 0.61 dl/g, hereinafter simply referred to as "PC-6"). 10 parts by mass of the resulting PC-6 was mixed with 40 parts by mass of paraxylene and 50 parts by mass of toluene to prepare coating solution F (viscosity: 36 mPa·s), which was subjected to application and evaluation in the same manner as Example 1.

Example 7

Polymerization was conducted in the same manner as Example 1 except that 13.4 g of 4,4'-biphenyldiol (hereinafter, simply referred to as "BP": from Honshu Chemical Industry) and 87.9 g of BPZ were used instead of BPC, thereby obtaining a polycarbonate resin (intrinsic viscosity: 0.64 dl/g, hereinafter simply referred to as "PC-7"). 10 parts by mass of the resulting PC-6 was mixed with 90 parts by mass of toluene to prepare coating solution G (viscosity: 18 mPa·s), which was subjected to application and evaluation in the same manner as Example 1.

Example 8

25 parts by mass of PC-1, 30 parts by mass of methyl ethyl ketone, 45 parts by mass of toluene, 0.0001 parts by mass of blue dye from Lanxess (trade name "MACROLEX Violet B") and 1 parts by mass of an anti-rust agent from Toyo Pharmachemical (trade name "Cebo 101") were mixed to prepare coating solution H (viscosity: 1050 mPa·s), which was applied onto a thin steel plate using a brush to conduct evaluation in the same manner as Example 1.

Example 9

Application and evaluation were conducted in the same manner as Example 1 except that 45 parts by mass of methyl ethyl ketone and 45 parts by mass of a commercially available weak solvent, i.e., a mixture of an aromatic hydrocarbon and an aliphatic hydrocarbon, (trade name "HAWS", from Shell Chemicals Japan) were used instead of 90 parts by mass of toluene, and that it was mixed with 10 parts by mass of PC-1 to prepare coating solution I (viscosity: 18 mPa·s).

Comparative Example 1

Polymerization was conducted in the same manner as Example 1 except that BPC was changed into 91.2 g of BPA and that TEBAC was not used, thereby obtaining a polycarbonate resin (intrinsic viscosity: 0.56 dl/g, hereinafter simply referred to as "PC-8"). While we tried to prepare a toluene coating solution using the resulting PC-8 in the same manner as Example 1, it did not dissolve in the solvent and thus could not be applied.

Comparative Example 2

A commercially available removable spray coating based on a vinyl chloride-vinyl acetate copolymer (from Audec Corporation, trade name: Rus Pack) was used to conduct application and evaluation in the same manner as Example 1.

Comparative Example 3

A coating solution was prepared, applied and evaluated in the same manner as Example 1 except that a commercially available acrylic resin Dianal BR-116 (from Mitsubishi Rayon) was used instead of PC-1 of Example 1.

Comparative Example 4

10 parts by mass of PC-2 of Example 2 was mixed with 45 parts by mass of pure water and 45 parts by mass of ethanol, but PC-2 hardly dissolved and the solution (viscosity: 3 mPa·s) was in a slurry state with Powderly floating matters even after 24 hours. Thus, it was unable to be applied.

Comparative Example 5

A coating solution was prepared in the same manner as Example 1 except that PC-2 of Example 2 was changed to 51 parts by mass and toluene was changed to 49 parts by mass, but the solution viscosity exceeded 400 Pa·s with almost no fluidity. Thus, it was unable to be applied.

a represents an integer of 1-1,000; and

X represents

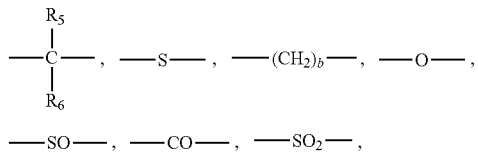

TABLE 1

| Examples/ Comparative examples | Resin | Solvent solubility | Pencil hardness | Peel hardness of coating film | Peeling resistance upon impact | Peelability | Thickness of coating film μm | Transmittance of solution % |
| --- | --- | --- | --- | --- | --- | --- | --- | --- |
| Example 1 | PC-1 | A | H | 5H | A | A | 27 | 99.8 |
| Example 2 | PC-2 | A | F | 5H | A | A | 16 | 99.8 |
| Example 3 | PC-3 | A | HB | 4H | A | A | 29 | 99.5 |
| Example 4 | PC-4 | A | F | 5H | A | A | 15 | 99.8 |
| Example 5 | PC-5 | A | HB | 4H | A | A | 27 | 99.6 |
| Example 6 | PC-6 | A | F | 5H | A | A | 22 | 99.6 |
| Example 7 | PC-7 | A | F | 5H | A | A | 19 | 99.5 |
| Example 8 | PC-1 | — | H | 5H | A | A | 58 | 49.5 |
| Example 9 | PC-1 | A | H | 5H | A | A | 22 | 99.8 |
| Comparative example 1 | PC-8 | C | — | — | — | — | — | 3.7 |
| Comparative example 2 | Vinyl chloride-vinyl acetate | — | 4B | 3B | C | A | 19 | 0.2 |
| Comparative example 3 | Acrylic resin | A | 2H | 4H | B | C | 21 | 99.7 |
| Comparative example 4 | PC-2 | C | — | — | — | — | — | 84.3 |
| Comparative example 5 | PC-2 | — | — | — | — | — | — | — |

INDUSTRIAL APPLICABILITY

An easy peel coating composition of the present invention can be used as an easy peel coating for protecting an article. In particular, it is effective in surface protection for metallic instruments and parts that are apt to rust. Moreover, since it is relatively hard as an easy peel coating and gives a strong coating film after drying, it is also applicable for a design purpose.

The invention claimed is:

1. An easy peel coating composition comprising:
   a polycarbonate resin having a structural unit represented by General formula (1):

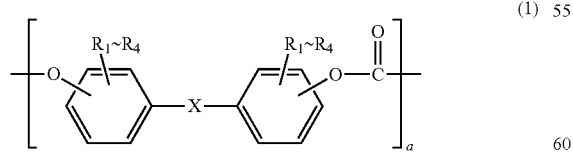

wherein, $R_1$-$R_4$ each independently represent hydrogen, fluorine, chlorine, bromine, iodine, or an optionally substituted C1-C20 alkyl group, C6-C12 aryl group, C2-C12 alkenyl group, C1-C5 alkoxy group or C7-C17 aralkyl group;

-continued

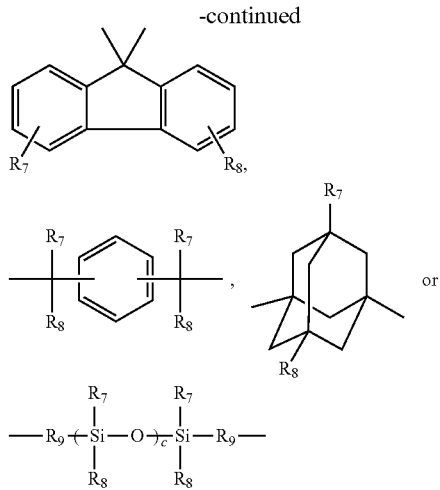

wherein $R_5$ and $R_6$ each independently represent hydrogen, fluorine, chlorine, bromine, iodine, or an optionally substituted C1-C20 alkyl group, C1-C5 alkoxy group or C6-C12 aryl group, or $R_5$ and $R_6$ bind to each other to represent a group that forms a C5-C20 carbocyclic ring or a heterocyclic ring of ring size 5-12;

$R_7$ and $R_8$ each independently represent hydrogen, fluorine, chlorine, bromine, iodine, or an optionally substituted C1-C9 alkyl group, C1-C5 alkoxy group, C2-C12 alkenyl group or C6-C12 aryl group;

$R_9$ represents an optionally substituted C1-C9 alkylene group;

b represents an integer of 0-20; and
c represents an integer of 1-500); and
a non-halogen-based organic solvent,
wherein the content of the polycarbonate resin in the composition is 0.1-50 mass %, and
the proportion of the structural unit represented by General formula (2) below:

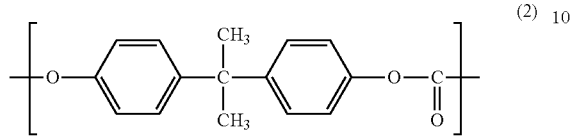
(2)

in the structural unit represented by General formula (1) is 0-80 mol % and
wherein the structural unit represented by General formula (1) comprises one or more selected from the group consisting of the structural units represented by General formulae (3)-(10):

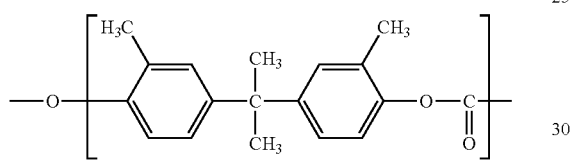
(3)

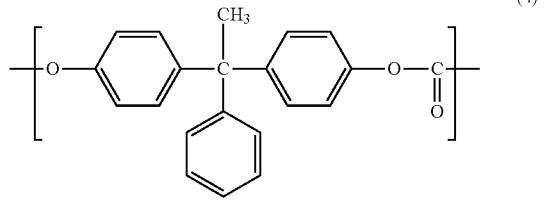
(4)

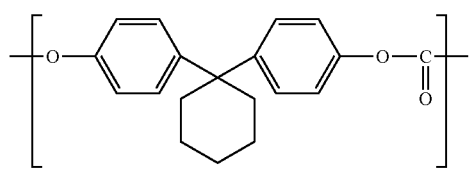
(5)

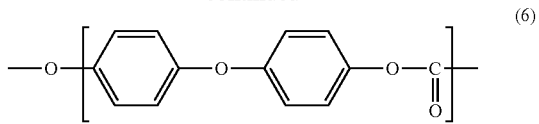
(6)

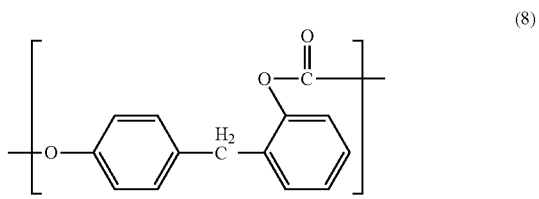
(7)

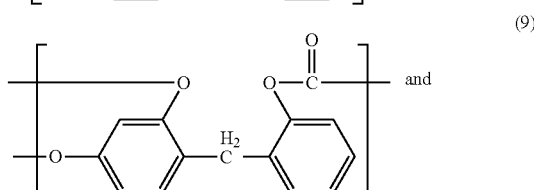
(8)

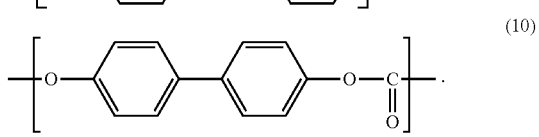
(9) and (10)

2. The composition according to claim 1, wherein the main component of the non-halogen-based organic solvent is a solvent comprising at least one selected from the group consisting of an aromatic hydrocarbon-based solvent, an ester-based solvent, a ketone-based solvent and an ether-based solvent.

3. The composition according to claim 1, which is used for protecting a surface of a metallic instrument or part.

4. The composition according to claim 1, wherein the polycarbonate resin has an intrinsic viscosity of 0.3-2.0 dl/g.

5. A coating film obtained by drying the composition according to claim 1.

6. The coating film of claim 5 having a peel hardness of 4H or harder.

* * * * *